US012781657B2

(12) United States Patent
Chare et al.

(10) Patent No.: US 12,781,657 B2
(45) Date of Patent: Nov. 3, 2026

(54) DECOMPOSITION CHAMBER FOR AFTERTREATMENT SYSTEM

(71) Applicant: Cummins Emission Solutions Inc., Columbus, IN (US)

(72) Inventors: Priyanka Vinod Chare, Pune (IN); Yash Pal, Una (IN); Donald Edward Willey, Huddersfield (GB); Allick Mounir Olive, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 19/081,694

(22) Filed: Mar. 17, 2025

(65) Prior Publication Data

US 2025/0305435 A1 Oct. 2, 2025

Related U.S. Application Data

(60) Provisional application No. 63/572,644, filed on Apr. 1, 2024.

(51) Int. Cl.
*F01N 3/28* (2006.01)
*B01F 25/40* (2022.01)
(Continued)

(52) U.S. Cl.
CPC ........... *F01N 3/2892* (2013.01); *F01N 3/206* (2013.01); *B01F 25/40* (2022.01); *B01F 25/42* (2022.01);
(Continued)

(58) Field of Classification Search
CPC combination set(s) only.
See application file for complete search history.

(56) References Cited

U.S. PATENT DOCUMENTS 3,317,001 A 5/1967 Powers et al.
3,348,629 A 10/1967 Cassel
(Continued)

FOREIGN PATENT DOCUMENTS

CN 301522079 S 4/2011
CN 308758674 S 5/2024
(Continued)

OTHER PUBLICATIONS

Non-Final Office Action in U.S. Appl. No. 18/543,149 issued Jan. 14, 2025.

(Continued)

*Primary Examiner* — Binh Q Tran
(74) *Attorney, Agent, or Firm* — Foley & Lardner LLP

(57) ABSTRACT

A decomposition chamber for an aftertreatment system includes a conduit centered on a conduit axis extending in a reference plane and a doser mount. The doser mount includes an injection opening centered on an injection axis. The injection axis extends in the reference plane. In the reference plane, the injection axis is oriented at an injection angle between 100 degrees and 170 degrees, inclusive, relative to the conduit axis. The decomposition chamber includes a mixing plate having plurality of lateral cross-members, a plurality of transverse crossmembers, and a plurality of deflectors. In the reference plane, an orientation of a plate plane in which the plurality of lateral crossmembers extend is at a plate angle between 10 and 80 degrees, inclusive, relative to the conduit axis. The decomposition chamber includes a vane mixer disposed in the conduit downstream of the mixing plate and a baffle.

20 Claims, 9 Drawing Sheets

(51) Int. Cl.

| | |
|---|---|
| ***B01F 25/42*** | (2022.01) |
| ***B01F 25/431*** | (2022.01) |
| ***B01F 25/432*** | (2022.01) |
| ***F01N 1/08*** | (2006.01) |
| ***F01N 3/20*** | (2006.01) |

(52) U.S. Cl.

CPC ......... *B01F 25/4317* (2022.01); *B01F 25/432* (2022.01); *F01N 1/086* (2013.01); *F01N 1/088* (2013.01); *F01N 3/208* (2013.01); *F01N 2240/20* (2013.01); *F01N 2330/38* (2013.01); *F01N 2570/14* (2013.01); *F01N 2610/1453* (2013.01)

(56) References Cited

U.S. PATENT DOCUMENTS

| | | | | |
|---|---|---|---|---|
| 3,500,954 | A | 3/1970 | Willette | |
| 5,325,665 | A | 7/1994 | Kiso et al. | |
| 5,524,739 | A | 6/1996 | Baier et al. | |
| 5,605,399 | A | 2/1997 | King | |
| 5,726,397 | A | 3/1998 | Mukai et al. | |
| 6,182,445 | B1 | 2/2001 | Yamazaki et al. | |
| D444,751 | S | 7/2001 | Park | |
| 7,814,745 | B2 | 10/2010 | Levin et al. | |
| D645,882 | S | 9/2011 | Duffek et al. | |
| D702,736 | S | 4/2014 | Tomioka et al. | |
| 9,341,097 | B2 | 5/2016 | Bays et al. | |
| 9,718,037 | B2 | 8/2017 | Harmon et al. | |
| D809,577 | S | 2/2018 | Mcdonald et al. | |
| 9,909,421 | B2 | 3/2018 | Staskowiak et al. | |
| 10,012,125 | B2 | 7/2018 | Yi et al. | |
| D855,090 | S | 7/2019 | Mcdonald et al. | |
| 10,450,921 | B2 | 10/2019 | Osada et al. | |
| 10,844,764 | B2 | 11/2020 | Brandl et al. | |
| 11,136,910 | B2 | 10/2021 | Liu et al. | |
| 2006/0150614 | A1 | 7/2006 | Cummings | |
| 2006/0283181 | A1 | 12/2006 | Crawley et al. | |
| 2010/0107614 | A1* | 5/2010 | Levin | B01F 25/4314 60/303 |
| 2011/0005208 | A1 | 1/2011 | Hamill | |
| 2011/0094206 | A1* | 4/2011 | Liu | B01F 25/4315 60/274 |
| 2012/0204541 | A1 | 8/2012 | Li et al. | |
| 2013/0104531 | A1* | 5/2013 | Cho | B01F 25/3141 60/302 |
| 2013/0170973 | A1 | 7/2013 | Staskowiak et al. | |
| 2014/0033686 | A1 | 2/2014 | Fischer et al. | |
| 2014/0260202 | A1* | 9/2014 | Bays | F01N 3/18 60/274 |
| 2015/0218996 | A1 | 8/2015 | Brandl et al. | |
| 2016/0175784 | A1* | 6/2016 | Harmon | B01F 23/2132 366/167.1 |
| 2016/0312679 | A1* | 10/2016 | Schellin | F01N 3/2066 |
| 2017/0314444 | A1 | 11/2017 | Yi et al. | |
| 2017/0342886 | A1* | 11/2017 | Gavin | F01N 3/2066 |
| 2017/0361287 | A1* | 12/2017 | Kim | F01N 3/2066 |
| 2019/0120110 | A1* | 4/2019 | Osada | B01F 25/3141 |
| 2019/0203626 | A1 | 7/2019 | Abhyankar et al. | |
| 2022/0298949 | A1 | 9/2022 | Chiruta et al. | |
| 2024/0360779 | A1 | 10/2024 | Riddle, II et al. | |

FOREIGN PATENT DOCUMENTS

| | | | |
|---|---|---|---|
| CN | 308618250 | S | 7/2024 |
| CN | 309135625 | S | 2/2025 |
| GB | 2 595 019 | A | 11/2021 |
| KR | 300505022 | S | 9/2008 |
| KR | 301004836 | S | 5/2019 |
| RU | 00117480 | S | 11/2019 |
| WO | WO-2020/250015 | A1 | 12/2020 |

OTHER PUBLICATIONS 2013-2018 Ram 6.7 Cummins Exhaust System, posted Mar. 28, 2019 [online], [retrieved Jul. 21, 2025]. Retrieved from internet, https:// www.youtube.com/watch?v= EPxW5ebtybc (Year: 2019).

Diesel Aftertreatment Tech tip, posted Sep. 30, 2020 [online], [retrieved Jul. 21, 2025]. Retrieved from internet, https:// www. youtube.com/watch?v=bfl5Xw1 mxBQ (Year: 2020).

Diesel Exhaust Systems, posted Feb. 2008 [online], [retrieved Jul. 21, 2025]. Retrieved from internet, https://dieselnet.com/tech/ diesel_exh_sys.php (Year: 2008).

Restriction Requirement in Design U.S. Appl. No. 29/935,369 issued Jul. 23, 2025.

Torchtree 53425 Catalytic Converter for Ranger 2001 2002 2003 2.3L 2.5L 3L 4L, posted Aug. 16, 2023 [online], [retrieved Jul. 21, 2025]. Retrieved from internet, https://www.amazon.com/T orchtree-53425-Catalytic-Converter-2001-2003/dp/BOC FWKPZ?F /ref (Year: 2023).

Office Action in U.S. Appl. No. 19/047,946 issued Nov. 28, 2025.

* cited by examiner

DECOMPOSITION CHAMBER FOR AFTERTREATMENT SYSTEM

CROSS-REFERENCE TO RELATED APPLICATION

This Application claims the benefit of and priority to U.S. Provisional Patent Application No. 63/572,644, filed Apr. 1, 2024, the entire contents of each of which are incorporated herein by reference.

TECHNICAL FIELD

This Application relates generally to decomposition chambers for an aftertreatment system of an internal combustion engine.

BACKGROUND

For internal combustion engines, such as diesel engines, nitrogen oxide ($NO_x$) compounds may be emitted in exhaust. It is desirable to reduce $NO_x$ emissions to comply with environmental regulations, for example. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

A component of the aftertreatment system may facilitate a chemical reaction between the exhaust and the reductant by causing mixing of the exhaust and reductant. However, depending on its configuration, the component can cause decreases in performance and/or efficiency of an internal combustion engine associated with the aftertreatment system. For example, the component may cause an increase in back pressure on the internal combustion engine, which can cause decreased efficiency of the internal combustion engine.

SUMMARY

In one embodiment, a decomposition chamber for an aftertreatment system includes a conduit having an inlet, an outlet, and a conduit wall extending between the inlet and the outlet. The conduit wall is centered on a conduit axis extending in a reference plane that bisects the conduit wall. The decomposition chamber includes a doser mount coupled to the conduit wall. The doser mount includes an injection opening centered on an injection axis. The injection axis extends in the reference plane, wherein, in the reference plane, the injection axis is oriented at an injection angle between 100 degrees and 170 degrees, inclusive, relative to the conduit axis. The decomposition chamber includes a mixing plate disposed in the conduit. The mixing plate includes a plurality of lateral crossmembers, a plurality of transverse crossmembers, and a plurality of deflectors. Each of the transverse crossmembers are coupled to at least one of the lateral crossmembers. Each of the deflectors are coupled to one of the lateral crossmembers or one of the transverse crossmembers. In the reference plane, an orientation of a plane in which the plurality of lateral crossmembers extend is at a plate angle between 10 and 80 degrees, inclusive, relative to the conduit axis. The decomposition chamber includes a vane mixer disposed in the conduit downstream of the mixing plate. The vane mixer includes a plurality of vanes. The vanes define a plurality of vane apertures therebetween. The decomposition chamber includes a baffle coupled to the conduit wall and comprising a portion having a partial annular shape.

In one embodiment, the doser mount comprises a connection port defining the injection opening; an upstream wall extending from the connection port toward the inlet of the conduit, in the reference plane, the upstream wall is oriented at a first mount angle relative to the conduit axis, the first mount angle between 0 and 5 degrees, inclusive; and a downstream wall extending from the connection port toward the outlet of the conduit, in the reference plane, the downstream wall is at a second mount angle relative to the conduit axis, the second mount angle between 135 and 175 degrees, inclusive.

In one embodiment, the vane mixer is disposed a first distance from the mixing plate along the conduit axis; and the baffle is disposed a second distance from the vane mixer along the conduit axis, the second distance greater than the first distance.

In one embodiment, the mixing plate comprises an upstream edge, wherein a first portion of the upstream edge is positioned at a first location along the conduit axis and opposite the doser mount, and a second portion of the upstream edge is positioned at a second location along the conduit axis, adjacent to and downstream from the doser mount.

In one embodiment, in the reference plane, the injection axis is at a deflection angle between 10 and 120 degrees, inclusive, relative to the plate plane.

In one embodiment, the baffle comprises a baffle wall coupled to the conduit wall; and a baffle flange projecting radially inward from the baffle wall.

In one embodiment, the baffle flange is disposed along a baffle plane, the baffle plane perpendicular to the reference plane; and in the reference plane, the plate plane in which the plurality of lateral crossmembers extend is at a plane angle relative to the baffle plane, the plane angle between 10 and 80 degrees, inclusive.

In one embodiment, the baffle extends along a portion of an inner surface of the conduit wall; and the reference plane bisects the doser mount and extends through a portion of the baffle.

In one embodiment, an upstream portion of the plurality of deflectors defines a deflector plane, wherein, in the reference plane, the deflector plane is parallel to the conduit axis.

In one embodiment, the conduit comprises a locating element; and the mixing plate comprises a locating feature configured to receive the locating element to facilitate positioning of the mixing plate in the decomposition chamber.

In one embodiment, the conduit wall comprises an inner surface; the locating element is a projection that extends into the conduit from the inner surface of the conduit wall; the mixing plate comprises a plate wall; and the locating feature is a recess in the plate wall configured to receive the locating element.

In one embodiment, the injection angle of the injection axis is based at least partially on a spray volume of a reductant, wherein the spray volume comprises a first point of impingement and a second point of impingement, the first point of impingement and the second point of impingement coincident with the mixing plate.

In one embodiment, a decomposition chamber for an aftertreatment system comprises a conduit having an inlet, an outlet, and a conduit wall extending between the inlet and the outlet, the conduit wall centered on a conduit axis extending in a reference plane that bisects the conduit wall; a doser mount coupled with the conduit wall; and a mixing plate disposed in the conduit. The mixing plate comprises a plate wall comprising an upstream edge; a plurality of lateral crossmembers interfacing with the plate wall, a plurality of transverse crossmembers interfacing with the plate wall, and a plurality of deflectors, each of the deflectors coupled to one of the lateral crossmembers or one of the transverse crossmembers; wherein a first portion of the upstream edge is positioned at a first location along the conduit axis and opposite the doser mount, and a second portion of the upstream edge is positioned at a second location along the conduit axis, adjacent to and downstream from the doser mount.

In one embodiment, the conduit comprises a locating element; and the mixing plate comprises a locating feature configured to receive the locating element to facilitate positioning of the mixing plate in the decomposition chamber.

In one embodiment, the conduit wall comprises an inner surface; the locating element is a projection that extends into the conduit from the inner surface of the conduit wall; and the locating feature is a recess in the plate wall configured to receive the projection.

In one embodiment, the doser mount comprises a connection port defining an injection opening; an upstream wall extending from the connection port toward the inlet of the conduit, in the reference plane, the upstream wall is oriented at a first mount angle relative to the conduit axis, the first mount angle between 0 and 5 degrees, inclusive; and a downstream wall extending from the connection port toward the outlet of the conduit, in the reference plane, the downstream wall is at a second mount angle relative to the conduit axis, the second mount angle between 135 and 175 degrees, inclusive.

In one embodiment, the doser mount comprises a connection port defining an injection opening centered on an injection axis, the injection axis extending in the reference plane; the mixing plate defines a plate plane; and in the reference plane, the injection axis is oriented at a deflection angle between 10 and 120 degrees, inclusive, relative to the plate plane.

In one embodiment, an upstream portion of the plurality of deflectors defines a deflector plane, wherein, in the reference plane, the deflector plane is parallel to the conduit axis.

In one embodiment, a decomposition chamber for an aftertreatment system comprises a conduit, comprising an inlet; an outlet; a conduit wall extending between the inlet and the outlet, the conduit wall centered on a conduit axis extending in a reference plane that bisects the conduit wall, the conduit wall comprising an inner surface; and a locating element projecting into the conduit from the inner surface of the conduit wall. The decomposition chamber comprises a doser mount coupled with the conduit wall; and a mixing plate disposed in the conduit. The mixing plate comprises a plate wall comprising a slot configured to receive the locating element, the slot extending into the plate wall from a downstream edge of the plate wall; a plurality of lateral crossmembers interfacing with the plate wall; a plurality of transverse crossmembers interfacing with the plate wall; and a plurality of deflectors, each of the deflectors coupled to one of the lateral crossmembers or one of the transverse crossmembers.

In one embodiment, the doser mount comprises a connection port defining an injection opening centered on an injection axis, the injection axis extending in the reference plane; the mixing plate defines a plate plane; and in the reference plane, the injection axis is oriented at a deflection angle between 10 and 120 degrees, inclusive, relative to the plate plane.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
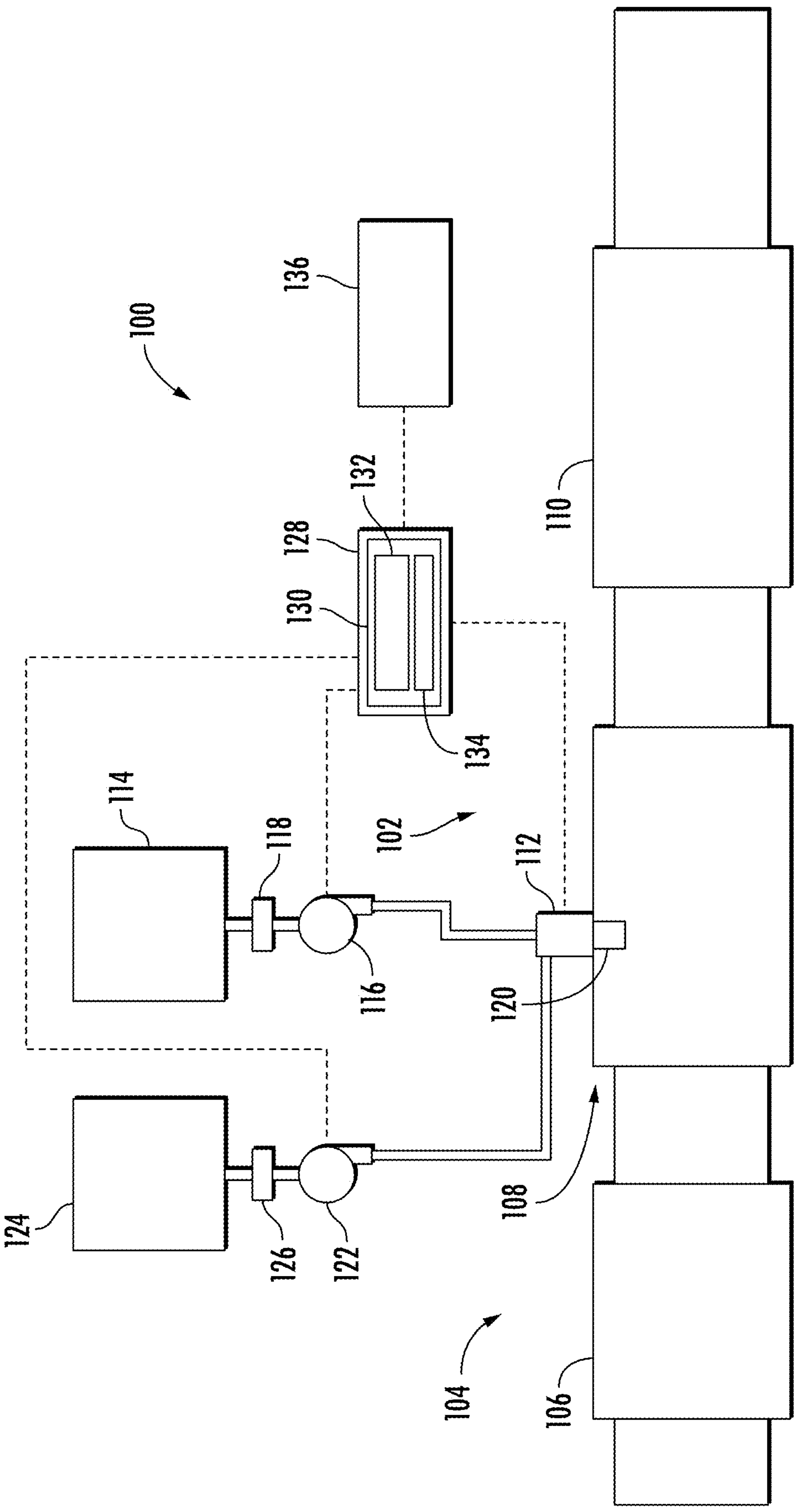
FIG. 1 is a block diagram of an example aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing decomposing chambers in an aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents, such as $NO_x$, $N_2$, $CO_2$, and/or $H_2O$. In some applications, an aftertreatment system is utilized to dose the exhaust with a reductant so as to reduce $NO_x$ emissions in the exhaust. These aftertreatment systems may include a decomposition chamber within which the reductant is provided and mixed with the exhaust.

Enhancing mixing of the reductant and exhaust can increase reduction of the $NO_x$ emissions and therefore increase desirability of an aftertreatment system. However, enhancing mixing of the reductant and exhaust can cause increased backpressure on an internal combustion engine having the aftertreatment system, thereby decreasing desirability of the aftertreatment system (e.g., because performance of the internal combustion engine is negatively impacted by the increased backpressure, etc.). Additionally, the reductant may form deposits within the aftertreatment system, such as on internal surfaces of the decomposition chamber, which can also increase the backpressure on the internal combustion engine, and/or because $NO_x$ emissions cannot be desirably reduced.

Some systems may include a decomposition chamber that is centered on an axis that is offset from an axis from which an inlet conduit is centered and offset from an axis on which an outlet conduit is centered. However, such a configuration can make it difficult to uniformly distribute reductant within the exhaust gas without increasing the backpressure within the system.

It is thus desirable to provide a decomposition chamber with various components configured to more uniformly distribute the reductant within the exhaust. A decomposition chamber is provided with a conduit having an inlet, an outlet, and a conduit wall extending between the inlet and outlet. The conduit wall is centered on a conduit axis. A doser mount is coupled to the conduit wall to facilitate injection of a reductant into the exhaust flowing through the decomposition chamber. A combination of a mixing plate, a vane mixer, and a baffle are disposed in the conduit to improve distribution of the reductant within the exhaust. When viewing a side cross-sectional view of the decomposition chamber, the vane mixer and the baffle are oriented perpendicular to the conduit axis, and the mixing plate is oriented at a different angle from the conduit axis. For example, in the cross-sectional view, an upper portion of the mixing plate is disposed downstream from a lower portion of the mixing plate such that the lower portion is disposed below the doser mount and the upper portion is disposed adjacent to, and downstream from, the doser mount. The angle of the mixing plate relative to the conduit axis and relative to an injection axis of the doser mount is configured to improve distribution of the reductant within the exhaust.

II. Example Aftertreatment System

FIG. 1 depicts an aftertreatment system 100 having an example reductant delivery system 102 for an exhaust conduit system 104 (e.g., pipe system, tube system, etc.). The aftertreatment system 100 includes the reductant delivery system 102, a particulate filter 106 (e.g., a diesel particulate filter (DPF), etc.), a decomposition chamber 108 (e.g., decomposition reactor, reactor pipe, decomposition tube, reactor tube, etc.), and a selective catalytic reduction (SCR) catalyst member 110.

The particulate filter 106 is configured to remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the particulate filter 106 to receive the exhaust containing NOx emissions and an outlet for the exhaust, NOx emissions, ammonia, and/or reductant to flow to the SCR catalyst member 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate (e.g., allow, permit, etc.) prolonged desirable operation of the reductant pump 116. In some embodiments, the reductant pump 116 is coupled to (e.g., attached to, fixed to, welded to, integrated with, etc.) a chassis of a vehicle associated with the aftertreatment system 100.

The dosing module 112 includes at least one injector 120. Each injector 120 is configured to dose the reductant into the exhaust (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst member 110. As a result, the reductant is injected by the injector 120 upstream of the SCR catalyst member 110 such that the SCR catalyst member 110 receives a mixture of the reductant and exhaust. The reductant droplets undergo the processes of evaporation, thermolysis, and hydrolysis to form non-$NO_x$ emissions (e.g., gaseous ammonia, etc.) within the decomposition chamber 108 and/or the exhaust conduit system 104.

The SCR catalyst member 110 is configured to assist in the reduction of $NO_x$ emissions by accelerating a $NO_x$ reduction process between the reductant and the $NO_x$ of the exhaust into diatomic nitrogen, water, and/or carbon dioxide. The SCR catalyst member 110 includes an inlet fluidly coupled to the decomposition chamber 108 from which exhaust and reductant are received and an outlet fluidly coupled to an end of the exhaust conduit system 104.

The aftertreatment system 100 may further include an oxidation catalyst (e.g., a diesel oxidation catalyst (DOC)) fluidly coupled to the exhaust conduit system 104 (e.g., downstream of the SCR catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the SCR catalyst member 110 may be combined into a single unit. In some implementations, the dosing module 112 may instead be positioned downstream of a turbocharger or upstream of a turbocharger.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines.

III. Example Decomposition Chamber

Figure 2:
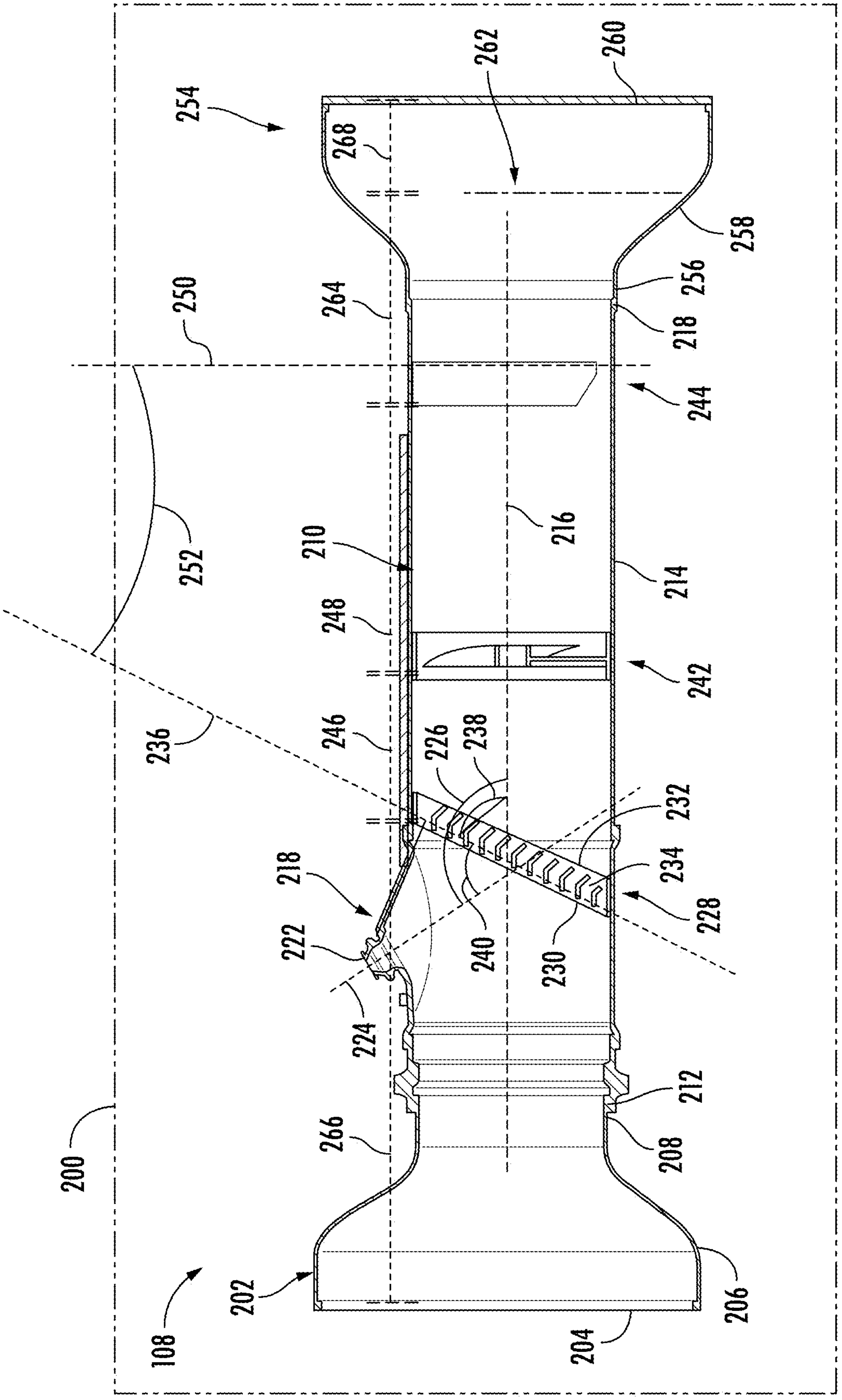
FIG. 2 is a cross-sectional view of an example decomposition chamber for an aftertreatment system.

FIG. 2 illustrates the decomposition chamber 108, according to an example embodiment. FIG. 2 is a cross-sectional view of the decomposition chamber 108 taken along a reference plane 200. The reference plane 200 bisects the decomposition chamber 108.

The decomposition chamber 108 includes an inlet fitting 202 (e.g., connector, section, etc.). The inlet fitting 202 is configured to receive exhaust and guide the exhaust into the decomposition chamber 108. The inlet fitting 202 includes an upstream inlet opening 204, an inlet body 206 that extends from the upstream inlet opening 204, and a downstream inlet opening 208. The inlet body 206 extends between the upstream inlet opening 204 and the downstream inlet opening 208. An area of the upstream inlet opening 204 is greater than an area of the downstream inlet opening 208.

The decomposition chamber 108 includes a conduit 210 configured to couple with the inlet fitting 202 via the downstream inlet opening 208. For example, the conduit 210 has an inlet 212. The conduit 210 couples with the downstream inlet opening 208 via the inlet 212. The conduit 210 has a conduit wall 214. The reference plane 200 bisects the conduit wall 214. The conduit wall 214 extends from the inlet 212. The conduit wall 214 is centered on a conduit axis 216. The conduit axis 216 extends in the reference plane 200. The conduit 210 has an outlet 218. The conduit wall 214 extends between the inlet 212 and the outlet 218.

Figure 3:
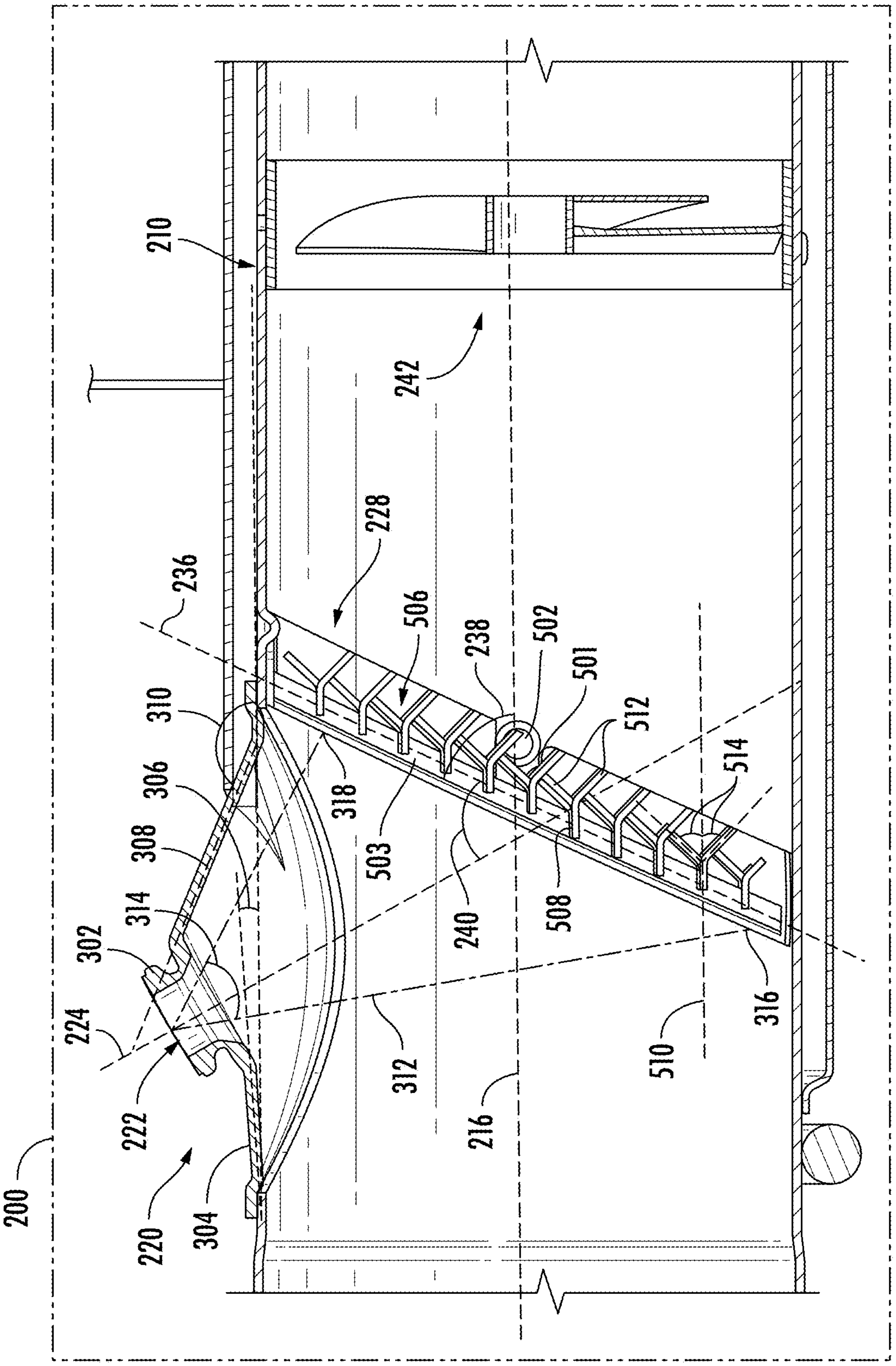
FIG. 3 is a cross-sectional view of a portion of the decomposition chamber of FIG. 2.
Figure 4:
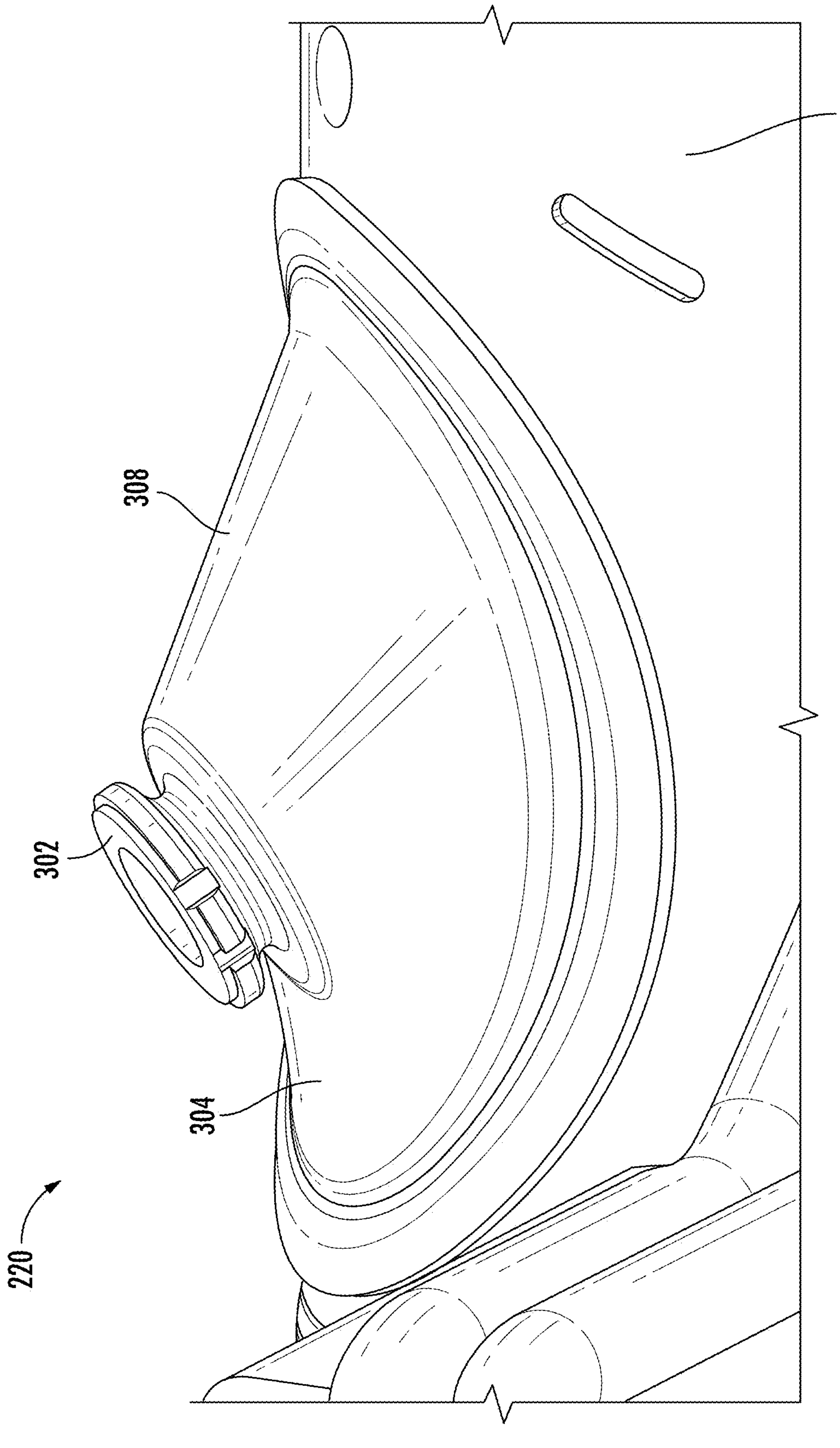
FIG. 4 is a top perspective view of a portion of the decomposition chamber of FIG. 2.

The decomposition chamber 108 includes a doser mount 220. FIGS. 3-4 illustrate the doser mount 220 according to an example embodiment. The doser mount 220 facilitates positioning of a dosing module 112 such that the dosing module 112 can provide reductant to the exhaust flowing through the decomposition chamber 108. The doser mount 220 is coupled to the conduit 210. For example, the doser mount 220 is coupled to an outer surface of the conduit wall 214.

The doser mount 220 includes an injection opening 222 that provides a path for reductant to enter the conduit 210. The injection opening 222 is centered on an injection axis 224. The injection axis 224 extends in the reference plane 200. The injection axis 224 is oriented at an injection angle 226 relative to the conduit axis 216. For example, the injection angle 226 may be between 100 degrees and 170 degrees, inclusive, between the injection axis 224 and the conduit axis 216 (e.g., when measured in a counterclockwise direction from the conduit axis 216 to the injection axis 224 in the reference plane 200). For example, the injection angle 226 may be approximately 120 degrees (e.g., +/−10%). In some embodiments, the injection angle 226 may be between 110 degrees and 160 degrees, inclusive, 120 degrees and 150 degrees, inclusive, 100 degrees and 140 degrees, inclusive, 130 degrees and 170 degrees, inclusive, or 130 degrees and 140 degrees, inclusive, among others.

As shown in FIGS. 3 and 4, the doser mount 220 includes a connection port 302 configured to facilitate coupling the dosing module 112 to the doser mount 220. The connection port 302 defines the injection opening 222.

The doser mount 220 includes an upstream wall 304 that extends from the connection port 302 toward the inlet 212 of the conduit 210. In the reference plane 200, the at least a portion of the upstream wall 304 is oriented at a first mount angle 306 relative to the conduit axis 216. For example, the first mount angle 306 may be between 0 and 10 degrees, inclusive, between the upstream wall 304 and the conduit axis 216 (e.g., when measured in a counterclockwise direction from the conduit axis 216 to the upstream wall 304 in the reference plane 200). For example, the first mount angle 306 may be approximately 4.26 degrees (e.g., +/−10%) In some embodiments, the first mount angle 306 may be between 0 degrees and 5 degrees, inclusive, 5 degrees and 10 degrees, inclusive, 2 degrees and 8 degrees, inclusive, 3 degrees and 7 degrees, inclusive, or 4 degrees and 6 degrees, inclusive, among others.

The doser mount 220 includes downstream wall 308 that extends from the connection port 302 toward the outlet of the conduit 210. In the reference plane 200, at least a portion of the downstream wall 308 is oriented at a second mount angle 310 relative to the conduit axis 216. For example, the second mount angle 310 may be between 120 and 175 degrees, inclusive, between the downstream wall and the conduit axis 216 (e.g., when measured in a counterclockwise direction from the conduit axis 216 to the downstream wall 308 in the reference plane 200). For example, the second mount angle 310 may be approximately 157.31 degrees (e.g., +/−10%). In some embodiments, the second mount angle 310 may be between 120 degrees and 140 degrees, inclusive, 140 degrees and 175 degrees, inclusive, 135 degrees and 155 degrees, inclusive, 135 degrees and 175 degrees, inclusive, or 140 degrees and 150 degrees, inclusive, inclusive, among others.

Figure 5:
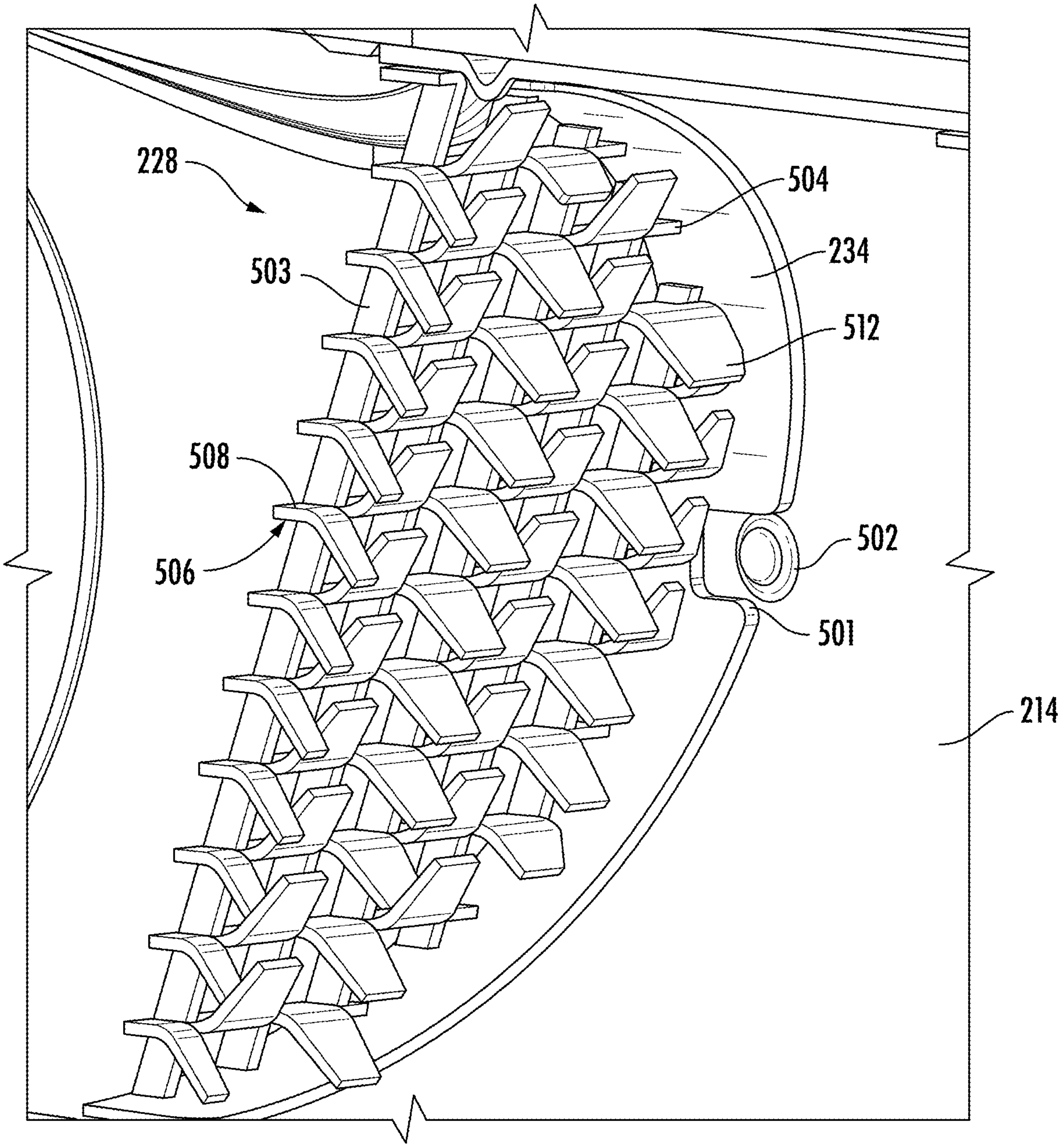
FIG. 5 is a perspective cross-sectional view of a portion of the decomposition chamber of FIG. 2.

Referring back to FIG. 2, the decomposition chamber 108 includes a mixing plate 228. FIGS. 3 and 5 illustrate the mixing plate 228 according to an example embodiment. The mixing plate 228 is disposed in the conduit 210. The mixing plate 228 includes an upstream edge 230, a downstream edge 232, and a plate wall 234 that extends between the upstream edge 230 and the downstream edge 232. An outer surface of the plate wall 234 interfaces with an inner surface of the conduit wall 214.

As shown in FIG. 5, the mixing plate 228 includes at least one locating feature 501 configured to facilitate proper placement and orientation of the mixing plate 228 in the conduit 210 during installation. For example, the conduit 210 may have a locating element 502 that corresponds with the locating feature 501 of the mixing plate 228. The locating feature 501 may be configured to interface or engage with the locating element to facilitate proper positioning of the mixing plate 228 in the conduit 210. The locating feature 501 and the locating element 502 can be any element or feature configured to facilitate positioning of the mixing plate. For example, the locating element 502 may be a projection that extends into the conduit 210 from an inner surface of the conduit wall 214 (e.g., projects radially inward). The locating feature 501 may be a slot or recess configured to receive the projection. For example, the locating feature 501 can be a slot that extends into the plate wall 234 from a downstream edge of the plate wall 234. Therefore, the mixing plate 228 may be prevented from being secured in the conduit 210 until the locating feature 501 is aligned with and engages with the locating element 502. The locating feature 501 and locating element 502 can also prevent unauthorized components from being disposed in the conduit 210. For example, a mixing plate 228 without a locating feature 501 that corresponds with a locating element 502 of the conduit 210 will not be able to be installed in the conduit 210. The mixing plate 228 can have any number of locating features 501. The various locating features 501 can all be the same or can be different. The locating feature 501 can be in or on the plate wall 234.

As shown in FIG. 5, the mixing plate 228 includes a plurality of lateral crossmembers 503. A first end of a lateral crossmember 503 can interface with the plate wall 234 at a first location and a second end of the lateral crossmember 503 can interface with the plate wall 234 at a second location. The lateral crossmembers 503 are parallel with each other. The mixing plate 228 includes a plurality of transverse crossmembers 504. A first end of a transverse crossmember can interface with the plate wall 234 at a first location and a second end of the transverse crossmember 504 can interface with the plate wall 234 at a second location. The transverse crossmembers 504 are parallel with each other. The transverse crossmembers 504 extend in a direction perpendicular to the lateral crossmembers 503. Each of the transverse crossmembers 504 is coupled to at least one of the lateral crossmembers 503.

The mixing plate 228 includes a plurality of deflectors 506. Each of the deflectors 506 is a part of or coupled to at least one of the lateral crossmembers 503 or the transverse crossmembers 504. A deflector 506 includes an upstream portion 508. The upstream portion 508 is a part of or coupled to a lateral crossmember 503 or a transverse crossmember 504. The upstream portion 508 defines a deflector plane 510. As shown in FIG. 3, in the reference plane 200, the deflector plane 510 is parallel to the conduit axis 216. The upstream portion 508 is configured to guide the reductant introduced into the decomposition chamber 108 via the doser mount 220 downstream to mix with the exhaust.

The deflector 506 includes a downstream portion 512 that extends from the upstream portion 508. In the reference plane 200, the downstream portion 512 is oriented at a deflector angle 514 relative to the deflector plane 510 (and the conduit axis 216). For example, the deflector angle 514 may be between 10 and 90 degrees, inclusive, between the downstream portion 512 and the deflector plane 510. For example, the deflector angle 514 may be approximately 90 degrees (e.g., +/−10%). In some embodiments, the deflector angle 514 may be between 10 degrees and 35 degrees, inclusive, 35 degrees and 80 degrees, inclusive, 20 degrees and 70 degrees, inclusive, 30 degrees and 60 degrees, inclusive, or 40 degrees and 50 degrees, inclusive, among others. As shown in FIGS. 3 and 5, a first downstream portion 512 of a first deflector 506 extends in a first direction (e.g., below the deflector plane 510) at the deflector angle 514 and a second downstream portion 512 of a second deflector 506 extends in a second direction (e.g., above the deflector plane 510) at the deflector angle 514. The direction of the downstream portions 512 of the deflectors 506 coupled with a transverse crossmember 504 may alternate such that a first downstream portion 512 extends in a different direction than adjacent downstream portions 512.

As shown in FIGS. 2 and 3, the mixing plate 228 defines a plate plane 236. The plurality of lateral crossmembers 503 extend in the plate plane 236. In the reference plane 200, the plate plane 236 is oriented at a plate angle 238 relative to the conduit axis 216. For example, the plate angle 238 may be between 10 and 80 degrees, inclusive, between the plate plane 236 and the conduit axis 216 (e.g., when measured in a counterclockwise direction from the conduit axis 216 to the downstream wall 308 in the reference plane 200). For example, the plate angle 238 may be approximately 60 degrees (e.g., +/−10%). In some embodiments, the plate angle 238 may be between 10 degrees and 40 degrees, inclusive, 40 degrees and 80 degrees, inclusive, 20 degrees and 70 degrees, inclusive, 30 degrees and 60 degrees, inclusive, or 40 degrees and 50 degrees, inclusive, among others.

With the plate plane 236 oriented at the plate angle 238, a first portion of the upstream edge 230 is disposed further upstream than a second portion of the upstream edge 230. For example, the first portion of the upstream edge 230 is positioned at a first location along the conduit axis 216 and opposite the doser mount 220. The second portion of the upstream edge 230 is positioned at a second location along the conduit axis 216 that is adjacent to, and downstream from the doser mount 220.

In the reference plane 200, the injection axis 224 is oriented at a deflection angle 240 relative to the plate plane 236. For example, the deflection angle 240 may be between 10 and 120 degrees, inclusive, between the plate plane 236 and the injection axis 224 (e.g., when measured in a counterclockwise direction from the plate plane 236 to the injection axis 224 in the reference plane 200). For example, the deflection angle 240 may be approximately 55 degrees (e.g., +/−10%). In some embodiments, the deflection angle 240 may be between 20 degrees and 40 degrees, inclusive, 60 degrees and 80 degrees, inclusive, 20 degrees and 80 degrees, inclusive, 80 degrees and 100 degrees, inclusive, or 60 degrees and 100 degrees, inclusive, among others.

As shown in FIG. 3, the dosing module 112 can provide reductant to the exhaust within the conduit 210. The reductant can have a spray volume 312. The spray volume 312 can have the shape of a cone, for example. The spray volume 312 can have a spray angle 314 such that the spray volume 312 has a first (e.g., lower) point of impingement 316 and a second (e.g., upper) point of impingement 318. An orientation and location of the mixing plate 228 can be at least partially based on spray angle of the spray volume 312. For example, the mixing plate 228 can be positioned and/or oriented relative to the doser mount 220 such that the first point of impingement 316 of the spray volume 312 is coincident with the mixing plate 228. For example, the mixing plate 228 can be positioned along the conduit axis 216 and be oriented at a plate angle 238 such that the first point of impingement 316 of the spray volume 312 contacts the mixing plate 228 and does not contact the inner surface of the conduit wall 214. The first point of impingement 316 can contact the mixing plate 228 at any location along the mixing plate 228. The mixing plate 228 can also be positioned relative to the doser mount such that the second point of impingement 316 of the spray volume 312 is coincident with the mixing plate 228. For example, the mixing plate 228 can be positioned along the conduit axis 216 and be oriented at a plate angle 238 such that the second point of impingement 318 of the spray volume 312 contacts the mixing plate 228 and does not contact the inner surface of the conduit wall 214.

The deflection angle 240 can be determined such that the spray volume 312 covers as much of the mixing plate 228 (or the plate plane 236) as possible. For example, the deflection angle 240 is configured such that the spray volume 312 covers a majority of a surface area of the mixing plate 228. The deflection angle 240 is configured to achieve an even spray distribution across the mixing plate 228.

Figure 6:
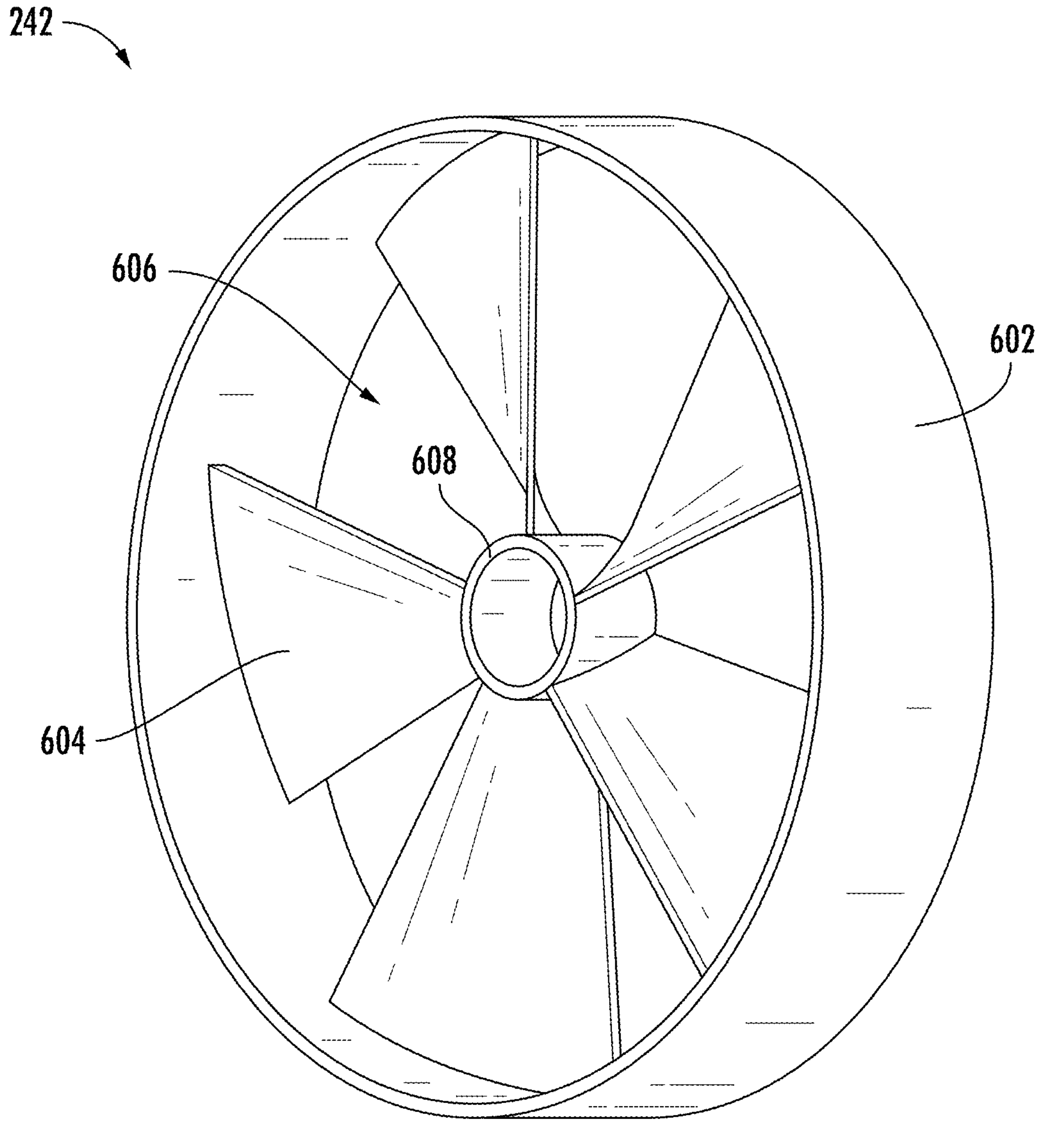
FIG. 6 is a perspective view of an example vane mixer for a decomposition chamber.
Figure 7:
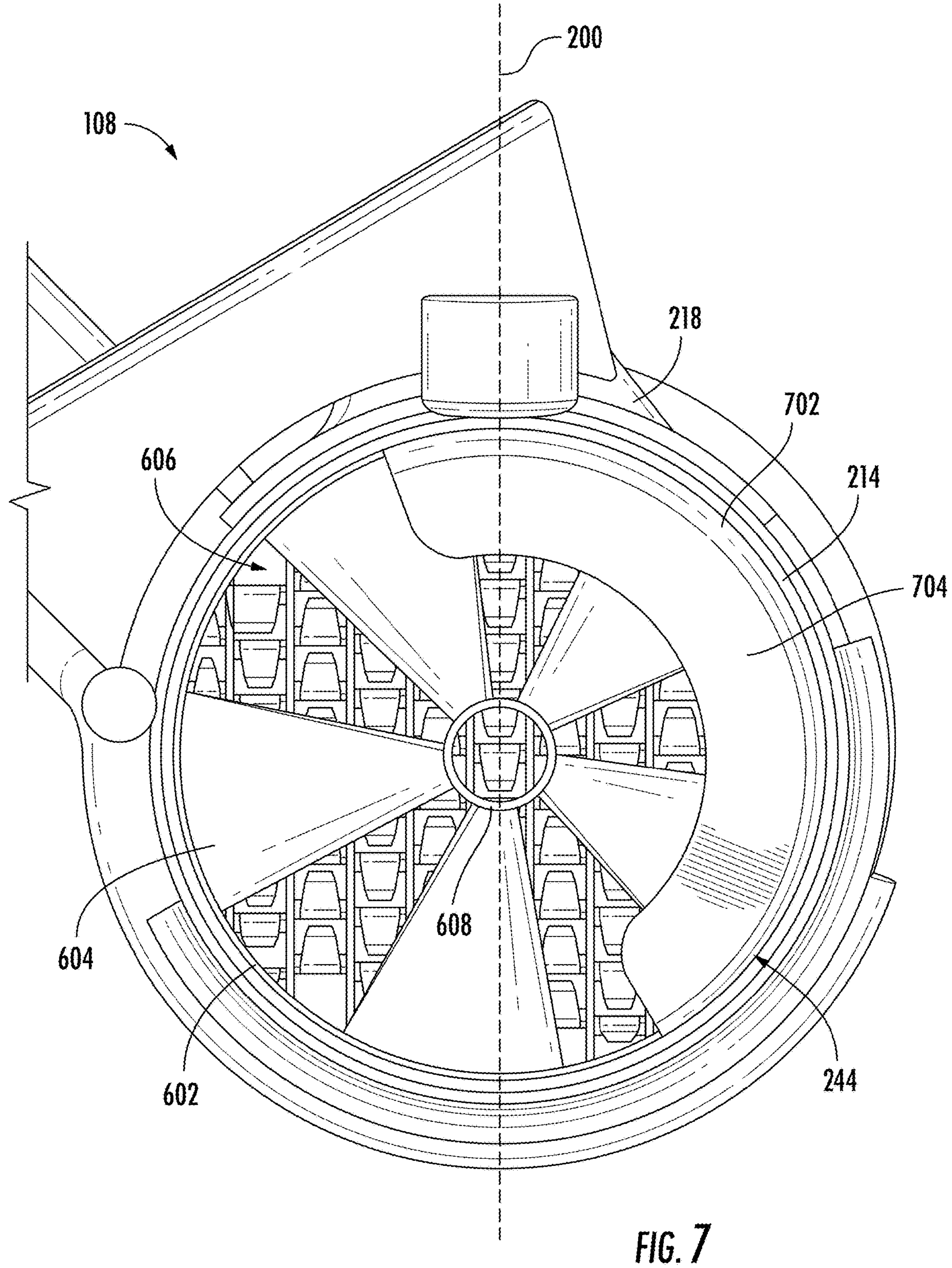
FIG. 7 is an end view of a portion of the decomposition chamber shown in FIG. 2 viewed from downstream looking upstream.

Referring back to FIG. 2, the decomposition chamber 108 includes a vane mixer 242 (e.g., mixing assembly, etc.). The vane mixer 242 is disposed in the conduit 210 downstream of the mixing plate 228. FIGS. 6-7 illustrate the vane mixer 242 according to an example embodiment. The vane mixer 242 includes a mixer wall 602. The mixer wall 602 may be coupled to the inner surface of the conduit wall 214.

As shown in FIGS. 6-7, the vane mixer 242 includes a plurality of vanes 604 (e.g., blades, etc.). The vanes 604 define a plurality of vane apertures 606 therebetween. The vane mixer 242 includes a hub 608. Each of the vanes 604 is coupled to the mixer wall 602 and the hub 608. In some embodiments, the vane mixer 242 may not include the mixer wall 602. In these embodiments, the vanes 604 may be coupled directly to the conduit wall 214. The exhaust in the decomposition chamber 108 can flow through the vane mixer 242 via the vane apertures 606 (e.g., between adjacent vanes 604). By flowing through the vane apertures 606, the exhaust is caused to rotate downstream of the vane mixer 242. This rotation facilitates mixing of the exhaust and reductant.

The vane mixer 242 includes a plurality of vanes 604. For example, the vane mixer 242 may include five vanes 604 equally spaced within the mixer wall 602. Each vane 604 may be oriented such that a first side edge of a vane 604 is disposed upstream from a second side edge of the vane 604.

In some embodiments, the hub 608 is configured to facilitate flow of the exhaust through the vane mixer 242 (e.g., such that a portion of the exhaust can flow through the hub 608 without flowing through a vane aperture 606). In such embodiments, the exhaust flowing through the hub 608 may aid in propelling the exhaust gas downstream of the vane mixer 242, thereby reduce a backpressure of the decomposition chamber 108.

Figure 8:
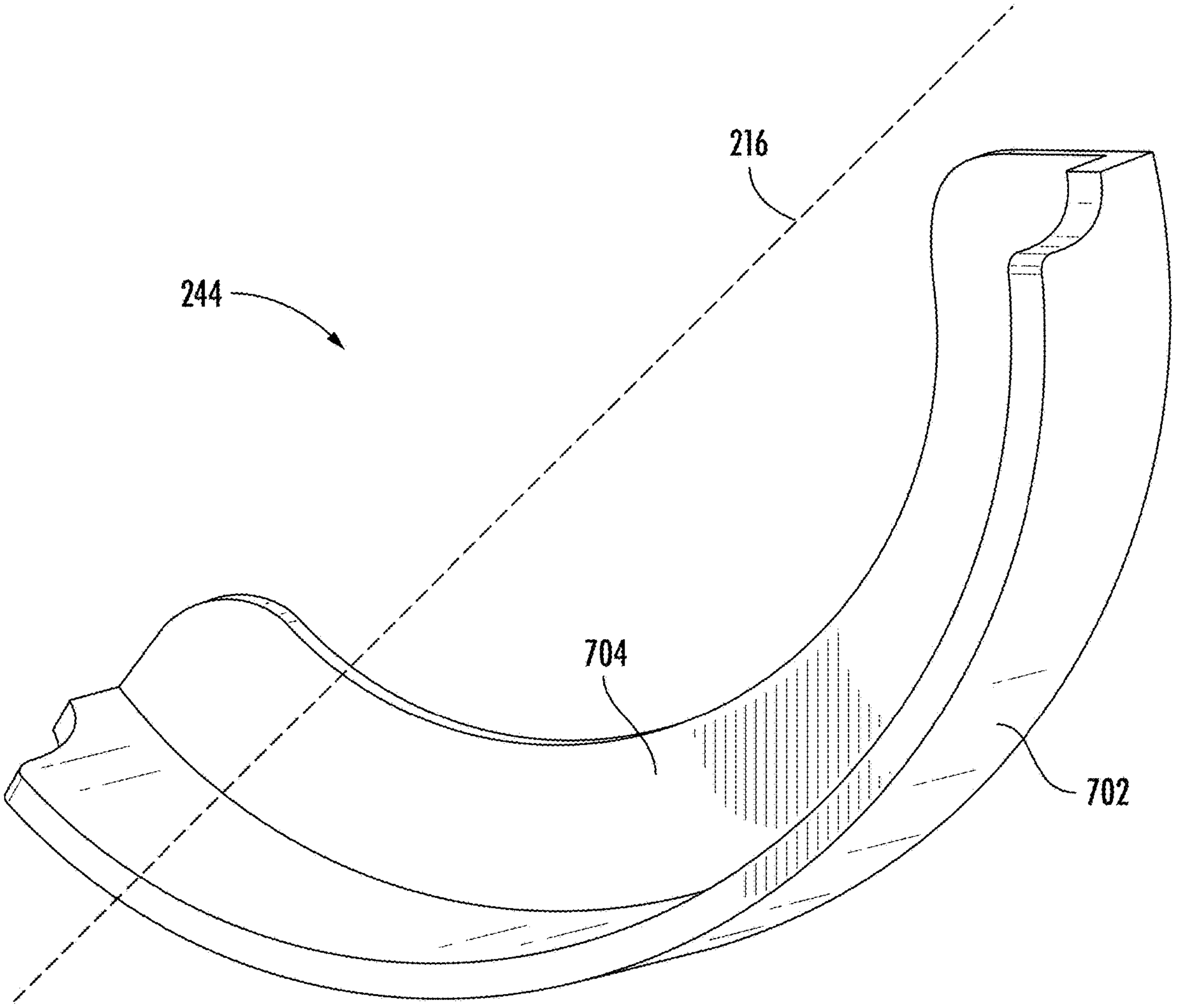
FIG. 8 is a perspective view of an example baffle for a decomposition chamber.

The decomposition chamber 108 includes a baffle 244. The baffle 244 is disposed in the conduit 210. The baffle 244 is disposed downstream of the vane mixer 242. FIGS. 7-8 illustrate the baffle 244 according to an example embodiment. The baffle 244 is configured to make the flow distribution of the exhaust and reductant mixture more uniform downstream of the vane mixer 242. For example, a location of the baffle 244 can be based on a location within the conduit 210 where particulates tend flow toward to disrupt the momentum and trajectory of those particles and create a more uniform flow.

The baffle 244 includes a first portion, shown as baffle wall 702. The baffle wall 702 extends along a portion of an inner surface of the conduit wall 214. The baffle wall 702 may be coupled to the inner surface of the conduit wall 214. The baffle wall 702 may have a shape of a portion of a cylinder. For example, the baffle wall 702 may have a partial annular shape (e.g., a partial ring or disk shape). The baffle wall may have a semi-circular shape such that it only defines a perimeter of a portion of a circle.

The baffle 244 includes a second portion, shown as baffle flange 704. The baffle flange 704 may have a shape of a portion of an annular object (e.g., an annular disk). The baffle flange 704 extends radially inward from the baffle wall 702 toward the conduit axis 216. The baffle flange 704 may extend from an edge of the baffle wall 702 or at a location between the edges of the baffle wall 702 (e.g., the baffle wall 702 may extend upstream and/or downstream of the baffle flange 704). In some embodiments the reference plane 200 bisects the baffle flange 704. In some embodiments, the reference plane 200 intersects one end of the baffle flange 704, as shown in FIG. 7. In some embodiments, the reference plane 200 intersects the baffle flange 704 at two locations (e.g., proximate ends of the baffle flange 704). In other embodiments, the reference plane 200 extends through a midsection of the baffle flange 704.

The baffle 244 is disposed further away from the vane mixer 242 than the vane mixer 242 is from the mixing plate 228. For example, the vane mixer 242 is disposed a first distance 246 from the mixing plate 228 along the conduit axis 216. The first distance 246 is measured from an upstream edge 230 (e.g., a downstream portion of the upstream edge 230) of the mixing plate 228 to an upstream edge of the vane mixer 242. The baffle 244 is disposed a second distance 248 from the vane mixer 242 along the conduit axis 216. The second distance 248 is measured from the upstream edge of the vane mixer 242 to an upstream edge of the baffle 244. The second distance 248 is greater than the first distance 246. For example, the first distance 246 can be between 80 mm and 90 mm (e.g., approximately 88.95 mm, etc.). The second distance 248 can be between 160 mm and 180 mm (e.g., approximately 168.8 mm, etc.).

As described above, the baffle 244 is disposed downstream of the vane mixer 242 to make the flow distribution more uniform by disrupting momentum and trajectory of some of the exhaust and reductant particles. However, no part of the baffle 244 (e.g., the baffle flange 704) is aligned with the hub 608. Therefore, the exhaust that flows through the hub 608 may avoid the baffle 244, which may reduce the backpressure in the decomposition chamber 108.

The baffle flange 704 is disposed along a baffle plane 250. The baffle plane 250 is perpendicular to the reference plane 200. In the reference plane 200, the plate plane 236 (e.g., the plane in which the plurality of lateral crossmembers 503 extend) is oriented at a plane angle 252 relative to the baffle plane 250. For example, plane angle 252 may be between 10 and 80 degrees, inclusive, between the baffle plane 250 and the plate plane 236 (e.g., when measured in a clockwise direction from the baffle plane 250 to the plate plane 236 in the reference plane 200). In some embodiments, the plane angle 252 may be between 10 degrees and 40 degrees, inclusive, 40 degrees and 80 degrees, inclusive, 20 degrees and 70 degrees, inclusive, 30 degrees and 60 degrees, inclusive, or 40 degrees and 50 degrees, inclusive, among others.

The orientation of the baffle 244 within the conduit 210 may be based on a location of the doser mount 220 For example, the baffle 244 extends only partially around the conduit axis 216. For example, the baffle 244 may extend between 160 degrees and 180 degrees (e.g., approximately 170.5 degrees, etc.) around the conduit axis 216. The reference plane 200 bisects the doser mount 220. As shown in FIG. 7, the baffle 244 is oriented in the conduit 210 such that the reference plane 200 extends through a portion of the baffle 244. The baffle 244 may be off- center such that a majority of the baffle 244 is disposed on a first side of the reference plane 200 and a minority of the baffle 244 is disposed on a second side of the reference plane 200.

Referring back to FIG. 2, the decomposition chamber 108 includes an outlet fitting 254 (e.g., connector, section, etc.). The outlet fitting 254 is configured to receive the exhaust from within the conduit 210 and guide the exhaust to a downstream component of the aftertreatment system 100 (e.g., the SCR catalyst member 110). The outlet fitting 254 includes an upstream outlet opening 256, an outlet body 258 that extends from the upstream outlet opening 256, and a downstream outlet opening 260. The outlet body 258 extends between the upstream outlet opening 256 and the downstream outlet opening 260. An area of the downstream outlet opening 260 is greater than an area of the upstream outlet opening 256.

The conduit 210 extends between the inlet fitting 202 and the outlet fitting 254. The outlet fitting 254 couples with the conduit 210. For example, the conduit 210 couples with the upstream outlet opening 256 via the outlet 218 of the conduit 210.

Figure 9:
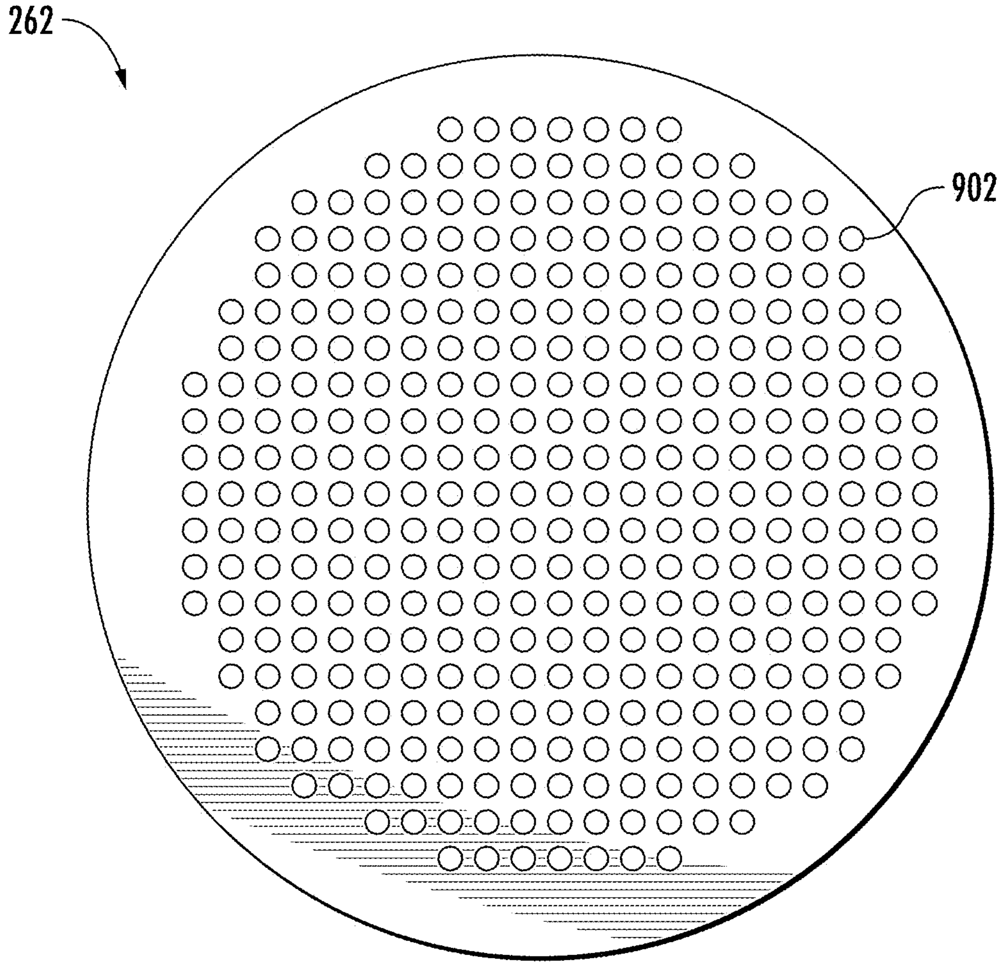
FIG. 9 is an end view of an example perforated plate for a decomposition chamber.

The decomposition chamber 108 includes a perforated plate 262. FIG. 9 illustrates the perforated plate 262 according to an example embodiment. The perforated plate 262 is configured to create a uniform flow of the exhaust and reductant mixture. This uniform flow may facilitate desirable operation of the catalyst member 110. As shown in FIG. 9, the perforated plate 262 may have a plurality of perforations 902. The perforations 902 may all be the same size or may have different sizes. The perforations 902 may be distributed symmetrically or asymmetrically across the perforated plate 262. For example, instead of being uniformly spaced about the perforated plate 262, the perforations 902 can be in clusters of different sizes that are not uniformly spaced about the perforated plate 262. The perforated plate 262 can have or define an asymmetrical array of perforations 902. The asymmetry of the perforations 902 can facilitate different amounts of fluid to flow through the perforated plate 262 at different locations.

The perforated plate 262 is disposed in the outlet fitting 254. At least a portion of the perimeter of the perforated plate 262 may interface with an inner surface of the outlet fitting 254. The perforated plate 262 may couple to the outlet fitting 254. The perforated plate 262 is disposed downstream of the vane mixer 242 and the baffle 244. The perforated plate 262 may be disposed a third distance 264 from the baffle 244 along the conduit axis 216. The third distance 264 is measured from the upstream edge of the baffle 244 to an upstream edge of the perforated plate 262. The third distance 264 may be greater than the first distance 246 and less than the second distance 248. For example, the third distance 264 may be between 120 mm and 140 mm (e.g., approximately 132.49 mm, etc.).

Referring back to FIG. 2, the mixing plate 228, the vane mixer 242, the baffle 244, and the perforated plate 262 are disposed between the upstream inlet opening 204 of the inlet fitting 202 and the downstream outlet opening 260 of the outlet fitting 254. The mixing plate 228 can be disposed a fourth distance 266 from the upstream inlet opening 204. The fourth distance 266 is measured from the upstream inlet opening 204 to the upstream edge 230 (e.g., a downstream portion of the upstream edge 230) of the mixing plate 228. The fourth distance 266 can be greater than the first distance 246, the second distance 248, and the third distance 264. For example, the fourth distance 266 can be between 290 mm and 310 mm (e.g., approximately 303.78 mm, etc.).

The perforated plate 262 can be disposed a fifth distance 268 from the downstream outlet opening 260. The fifth distance 268 is measured from the upstream edge of the perforated plate 262 to the downstream outlet opening 260. The fifth distance 268 can be less than the first distance 246, the second distance 248, the third distance 264, and the fourth distance 266. For example, the fifth distance 268 can be between 50 mm and 70 mm (e.g., approximately 56.5 mm, etc.).

The decomposition chamber 108 can have a first ratio between the first distance 246 and the second distance 248. For example, the first ratio can be between 0.3 and 0.75 (e.g., approximately 0.53, etc.). The decomposition chamber 108 can have a second ratio between the first distance 246 and the third distance 264. For example, the second ration can be between 0.5 and 0.8 (e.g., approximately 0.67, etc.). The decomposition chamber 108 can have a third ratio between the first distance 246 and the fourth distance 266. For example, the third ratio can be between 0.15 and 0.45 (e.g., approximately 0.29, etc.). The decomposition chamber 108 can have a fourth ratio between the first distance 246 and the fifth distance 268. For example, the fourth ratio can be between 1.3 and 1.8 (e.g., approximately 1.57, etc.). The decomposition chamber 108 can have a fifth ratio between the second distance 248 and the third distance 264. For example, the fifth ratio can be between 1.2 and 1.7 (e.g., approximately 1.27, etc.). The decomposition chamber 108 can have a sixth ratio between the second distance 248 and the fourth distance 266. For example, the sixth ratio can be between 0.3 and 0.7 (e.g., approximately 0.56, etc.). The decomposition chamber 108 can have a seventh ratio between the second distance 248 and the fifth distance 268. For example, the seventh ratio can be between 1.2 and 2.0 (e.g., approximately 1.57, etc.). The decomposition chamber 108 can have an eighth ratio between the third distance 264 and the fourth distance 266. For example, the eighth ratio can be between 0.2-0.6 (e.g., approximately 0.44, etc.). The decomposition chamber 108 can have a ninth ratio between the third distance 264 and the fifth distance 268. For example, the ninth ratio can be between 2 and 3.2 (e.g., approximately 2.34, etc.). The decomposition chamber 108 can have a tenth ratio between the fourth distance 266 and the fifth distance 268. For example the tenth ratio can be between 8 and 4 (e.g., approximately 5.38, etc.).

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2,etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A decomposition chamber for an aftertreatment system, the decomposition chamber comprising:

a conduit having an inlet, an outlet, and a conduit wall extending between the inlet and the outlet, the conduit wall centered on a conduit axis extending in a reference plane that bisects the conduit wall;

a doser mount coupled to the conduit wall, the doser mount comprising an injection opening centered on an injection axis, the injection axis extending in the reference plane, wherein, in the reference plane, the injection axis is oriented at an injection angle between 100 degrees and 170 degrees, inclusive, relative to the conduit axis;

a mixing plate disposed in the conduit, the mixing plate comprising:

a plurality of lateral crossmembers, a plurality of transverse crossmembers, each of the transverse crossmembers coupled to at least one of the lateral crossmembers, and a plurality of deflectors, each of the deflectors coupled to one of the lateral crossmembers or one of the transverse crossmembers, wherein:

in the reference plane, an orientation of a plate plane in which the plurality of lateral crossmembers extend is at a plate angle between 10 and 80 degrees, inclusive, relative to the conduit axis;

a vane mixer disposed in the conduit downstream of the mixing plate, the vane mixer comprising a plurality of vanes, the vanes defining a plurality of vane apertures therebetween; and a baffle coupled to the conduit wall and comprising a portion having a partial annular shape.

2. The decomposition chamber of claim 1, wherein:

the doser mount comprises:

a connection port defining the injection opening, an upstream wall extending from the connection port toward the inlet of the conduit, in the reference plane, the upstream wall is oriented at a first mount angle relative to the conduit axis, the first mount angle between 0 and 5 degrees, inclusive, and a downstream wall extending from the connection port toward the outlet of the conduit, in the reference plane, the downstream wall is at a second mount angle relative to the conduit axis, the second mount angle between 135 and 175 degrees, inclusive.

3. The decomposition chamber of claim 1, wherein:

the vane mixer is disposed a first distance from the mixing plate along the conduit axis; and the baffle is disposed a second distance from the vane mixer along the conduit axis, the second distance greater than the first distance.

4. The decomposition chamber of claim 1, wherein the mixing plate comprises an upstream edge, wherein a first portion of the upstream edge is positioned at a first location along the conduit axis and opposite the doser mount, and a second portion of the upstream edge is positioned at a second location along the conduit axis, adjacent to and downstream from the doser mount.

5. The decomposition chamber of claim 1, wherein in the reference plane, the injection axis is at a deflection angle between 10 and 120 degrees, inclusive, relative to the plate plane.

6. The decomposition chamber of claim 1, wherein:

the baffle comprises:

a baffle wall coupled to the conduit wall, and a baffle flange projecting radially inward from the baffle wall.

7. The decomposition chamber of claim 6, wherein:

the baffle flange is disposed along a baffle plane, the baffle plane perpendicular to the reference plane; and in the reference plane, the plate plane in which the plurality of lateral crossmembers extend is at a plane angle relative to the baffle plane, the plane angle between 10 and 80 degrees, inclusive.

8. The decomposition chamber of claim 1, wherein:

the baffle extends along a portion of an inner surface of the conduit wall; and the reference plane bisects the doser mount and extends through a portion of the baffle.

9. The decomposition chamber of claim 1, wherein an upstream portion of the plurality of deflectors defines a deflector plane, wherein, in the reference plane, the deflector plane is parallel to the conduit axis.

10. The decomposition chamber of claim 1, wherein:

the conduit comprises a locating element; and the mixing plate comprises a locating feature configured to receive the locating element to facilitate positioning of the mixing plate in the decomposition chamber.

11. The decomposition chamber of claim 10, wherein:

the conduit wall comprises an inner surface;

the locating element is a projection that extends into the conduit from the inner surface of the conduit wall;

the mixing plate comprises a plate wall; and the locating feature is a recess in the plate wall configured to receive the locating element.

12. The decomposition chamber of claim 1, wherein the injection angle of the injection axis is based at least partially on a spray volume of a reductant, wherein the spray volume comprises a first point of impingement and a second point of impingement, the first point of impingement and the second point of impingement coincident with the mixing plate.

13. A decomposition chamber for an aftertreatment system, the decomposition chamber comprising:

a conduit having an inlet, an outlet, a locating element, and a conduit wall extending between the inlet and the outlet, the conduit wall centered on a conduit axis extending in a reference plane that bisects the conduit wall;

a doser mount coupled with the conduit wall; and a mixing plate disposed in the conduit, the mixing plate comprising:

a plate wall comprising an upstream edge;

a plurality of lateral crossmembers interfacing with the plate wall, a plurality of transverse crossmembers interfacing with the plate wall, a locating feature configured to receive the locating element to facilitate positioning of the mixing plate in the decomposition chamber, and a plurality of deflectors, each of the deflectors coupled to one of the lateral crossmembers or one of the transverse crossmembers; wherein:

a first portion of the upstream edge is positioned at a first location along the conduit axis and opposite the doser mount, and a second portion of the upstream edge is positioned at a second location along the conduit axis, adjacent to and downstream from the doser mount.

14. The decomposition chamber of claim 13, wherein:

the conduit wall comprises an inner surface;

the locating element is a projection that extends into the conduit from the inner surface of the conduit wall; and the locating feature is a recess in the plate wall configured to receive the projection.

15. The decomposition chamber of claim 13, wherein:

the doser mount comprises:

a connection port defining an injection opening, an upstream wall extending from the connection port toward the inlet of the conduit, in the reference plane, the upstream wall is oriented at a first mount angle relative to the conduit axis, the first mount angle between 0 and 5 degrees, inclusive, and a downstream wall extending from the connection port toward the outlet of the conduit, in the reference plane, the downstream wall is at a second mount angle relative to the conduit axis, the second mount angle between 135 and 175 degrees, inclusive.

16. The decomposition chamber of claim 13, wherein:

the doser mount comprises a connection port defining an injection opening centered on an injection axis, the injection axis extending in the reference plane;

the mixing plate defines a plate plane; and in the reference plane, the injection axis is oriented at a deflection angle between 10 and 120 degrees, inclusive, relative to the plate plane.

17. The decomposition chamber of claim 13, wherein an upstream portion of the plurality of deflectors defines a deflector plane, wherein, in the reference plane, the deflector plane is parallel to the conduit axis.

18. A decomposition chamber for an aftertreatment system, the decomposition chamber comprising:

a conduit, comprising:

an inlet;

an outlet;

a conduit wall extending between the inlet and the outlet, the conduit wall centered on a conduit axis extending in a reference plane that bisects the conduit wall, the conduit wall comprising an inner surface; and a locating element projecting into the conduit from the inner surface of the conduit wall;

a doser mount coupled with the conduit wall; and a mixing plate disposed in the conduit, the mixing plate comprising:

a plate wall comprising a slot configured to receive the locating element, the slot extending into the plate wall from a downstream edge of the plate wall;

a plurality of lateral crossmembers interfacing with the plate wall;

a plurality of transverse crossmembers interfacing with the plate wall; and a plurality of deflectors, each of the deflectors coupled to one of the lateral crossmembers or one of the transverse crossmembers.

19. The decomposition chamber of claim 18, wherein:

the doser mount comprises a connection port defining an injection opening centered on an injection axis, the injection axis extending in the reference plane;

the mixing plate defines a plate plane; and in the reference plane, the injection axis is oriented at a deflection angle between 10 and 120 degrees, inclusive, relative to the plate plane.

20. A decomposition chamber for an aftertreatment system, the decomposition chamber comprising:

a conduit having an inlet, an outlet, and a conduit wall extending between the inlet and the outlet, the conduit wall centered on a conduit axis extending in a reference plane that bisects the conduit wall;

a doser mount coupled with the conduit wall; and a mixing plate disposed in the conduit, the mixing plate comprising:

a plate wall comprising an upstream edge;

a plurality of lateral crossmembers interfacing with the plate wall, a plurality of transverse crossmembers interfacing with the plate wall, and a plurality of deflectors, each of the deflectors coupled to one of the lateral crossmembers or one of the transverse crossmembers; wherein:

a first portion of the upstream edge is positioned at a first location along the conduit axis and opposite the doser mount, and a second portion of the upstream edge is positioned at a second location along the conduit axis, adjacent to and downstream from the doser mount;

wherein the doser mount comprises:

a connection port defining an injection opening, an upstream wall extending from the connection port toward the inlet of the conduit, in the reference plane, the upstream wall is oriented at a first mount angle relative to the conduit axis, the first mount angle between 0 and 5 degrees, inclusive, and a downstream wall extending from the connection port toward the outlet of the conduit, in the reference plane, the downstream wall is at a second mount angle relative to the conduit axis, the second mount angle between 135 and 175 degrees, inclusive.

* * * * *